(12) United States Patent
Lee et al.

(10) Patent No.: US 10,270,677 B2
(45) Date of Patent: Apr. 23, 2019

(54) METHOD AND DEVICE FOR ANALYZING INTERACTION NETWORK

(71) Applicant: SAMSUNG ELECTRONICS CO., LTD., Suwon-si (KR)

(72) Inventors: Dongseon Lee, Suwon-si (KR); Jinhan Kim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 260 days.

(21) Appl. No.: 15/251,536

(22) Filed: Aug. 30, 2016

(65) Prior Publication Data

US 2017/0099207 A1    Apr. 6, 2017

(30) Foreign Application Priority Data

Oct. 6, 2015    (KR) .................. 10-2015-0140386

(51) Int. Cl.
*G06F 15/177*    (2006.01)
*H04L 12/26*    (2006.01)

(52) U.S. Cl.
CPC .................. *H04L 43/14* (2013.01)

(58) Field of Classification Search
USPC ........................................ 709/220
See application file for complete search history.

(56) References Cited

U.S. PATENT DOCUMENTS

| | | | | |
|---|---|---|---|---|
| 5,276,789 A * | 1/1994 | Besaw | .................. | G06F 17/509 345/440 |
| 5,910,803 A * | 6/1999 | Grau | ...................... | H04L 41/12 709/224 |
| 6,040,834 A * | 3/2000 | Jain | ........................ | H04L 41/06 709/223 |
| 7,171,624 B2 * | 1/2007 | Baldwin | ............... | G06F 3/0481 715/733 |
| 7,257,563 B2 | 8/2007 | Shmulevich et al. | | |
| 7,310,774 B1 * | 12/2007 | Arquie | .................... | H04L 41/12 715/734 |
| 7,430,593 B2 * | 9/2008 | Baldwin | ............. | H04L 67/1097 709/223 |
| 7,475,350 B2 * | 1/2009 | Boyles | .............. | G06F 17/30873 715/734 |
| 8,725,871 B2 * | 5/2014 | Ding | .................... | G06F 11/3006 370/252 |
| 8,769,696 B2 * | 7/2014 | Pistoia | .................... | G06F 21/00 380/29 |
| 8,788,449 B2 | 7/2014 | Love et al. | | |
| 8,881,300 B2 * | 11/2014 | Pistoia | .................... | G06F 21/00 380/33 |
| 8,990,058 B2 | 3/2015 | Cheng et al. | | |
| 2003/0005068 A1 * | 1/2003 | Nickel | .................. | G06F 9/5066 709/208 |
| 2013/0139125 A1 | 5/2013 | McCoy | | |
| 2015/0039279 A1 | 2/2015 | Volovoi | | |
| 2016/0026502 A1 * | 1/2016 | Stanfill | ................. | G06F 9/5038 719/318 |

* cited by examiner

*Primary Examiner* — Alicia Baturay
(74) *Attorney, Agent, or Firm* — Cantor Colburn LLP (57) ABSTRACT

A method for analyzing an interaction network includes: interpreting input data; and determining states of a plurality of nodes described to the input data based on information acquired by the interpretation of the input data, and updating a state of a system expressed as the interaction network based on the states of the nodes, in which at least one piece of information for describing the states of the nodes is arranged in series in the input data.

18 Claims, 5 Drawing Sheets

METHOD AND DEVICE FOR ANALYZING INTERACTION NETWORK

CROSS-REFERENCE TO RELATED APPLICATION

This application claims priority to Korean Patent Application No. 10-2015-0140386, filed on Oct. 6, 2015, and all the benefits accruing therefrom under 35 U.S.C. § 119, the content of which in its entirety is herein incorporated by reference.

BACKGROUND (a) Field

Exemplary embodiments of the invention relate to a method and device for analyzing an interaction network between entities.

(b) Description of the Related Art

Systems of scientific fields, such as physics, chemistry or biology, and various social phenomena may be expressed using a complicated interaction network among entities. The respective entities included as constituent elements in the interaction network configure an interaction relationship. A computer simulation scheme is typically used to understand a dynamic characteristic of the interaction network.

In the computer simulation for simulating the interaction network, operational scripts that are arranged based on the network may be used for influences and conditions received by respective constituent elements from other constituent elements. In such a computer simulation, the operational scripts may be expressed as a plurality of lines.

In another way, a graphic interface may be used to express the interaction network in a visual manner. When the interaction network is expressed as a graphic interface, the interaction network includes nodes for expressing entities as constituent elements and edges for expressing relationships among the respective nodes and expressing influences among the nodes. In such a graphic interface, functional expressions of the influences among the nodes are not expressed with numbers.

SUMMARY

Conventionally, the interaction network is expressed in a complicated form. Therefore, when the interaction network is computer simulated using a text based programming method, it is difficult to read the scripts on which operational conditions and operational functions are written and understand an entire condition. Further, it is difficult to modify the operational condition because of irregularity and complexity of the operational scripts. When the interaction network is expressed as a graphic interface for a user to help visually understand the interaction network, the general connection state may be easily and visually understood, but the values for describing actual dynamic characteristics such as a quantitative correlation among the constituent elements or a functional relationship including a logical relationship may be difficult to be expressed so it may be inappropriate for the computer simulation.

Embodiments of the invention are directed to a method for analyzing an interaction network by using an appropriate data structure for describing a state of a node included in the interaction network.

Embodiments of the invention are directed to a device for analyzing an interaction network by using an appropriate data structure for describing a state of a node included in the interaction network.

An exemplary embodiment of the invention provides a method for analyzing an interaction network. The method for analyzing an interaction network includes: interpreting input data; and determining states of a plurality of nodes described to the input data based on information acquired by the interpretation of the input data, and updating a state of a system expressed as the interaction network based on the states of the nodes, in which at least one piece of information for describing the states of the nodes is arranged in series in the input data.

In an exemplary embodiment, the at least one piece of information may include a state area, a function area and a condition area, and the input data may have a structure in which the state area, the function area and the condition area are arranged in series for one node of the nodes.

In an exemplary embodiment, the state area may be an information area for describing a state of the one node.

In an exemplary embodiment, the function area may be an information area for indicating a factor influencing a state of the one node, and may include a function for showing a method influencing the state of the one node and an identifier of a neighboring node of the one node corresponding to a variable of the function.

In an exemplary embodiment, the condition area may be an information area for representing an initial state and a limit state of the one node, the condition area may be separately expressed by a separator, and the condition area may be finished with an ending mark.

In an exemplary embodiment, the method may further include: determining whether the updated state is against a condition of limitation; and when the updated state is not against the condition of limitation, storing an updated state of the system.

In an exemplary embodiment, the method may further include: determining whether to finish an analysis on the interaction network based upon a state history of the system.

In an exemplary embodiment, the determining whether to finish the analysis on the interaction network may include finishing the analysis when the system continues staying in one state in the state history.

In an exemplary embodiment, the determining whether to finish the analysis on the interaction network may include finishing the analysis when a plurality of states is repeated with a constant period and a repetition order of the states is the same in the state history.

In an exemplary embodiment, the determining whether to finish the analysis on the interaction network may include finishing the analysis when the update is performed over a predetermined number of times and the system does not converge to at least one state.

Another exemplary embodiment of the invention provides a device for analyzing an interaction network. The device for analyzing an interaction network includes: a data structure interpreter which interprets input data; and a state updater which determines states of a plurality of nodes described to the input data based upon information acquired by the interpretation of the input data, and updating a state of a system expressed as the interaction network based on the states of the nodes, in which at least one piece of information for describing the states of the nodes is arranged in series in the input data.

In an exemplary embodiment, the at least one piece of information may include a state area, a function area and a condition area, and the data may have a structure in which the state area, the function area and the condition area are arranged in series for one node of the nodes.

In an exemplary embodiment, the state area may be an information area for describing a state of the one node.

In an exemplary embodiment, the function area may be an information area for indicating a factor influencing a state of the one node, and may include a function for showing a method influencing the state of the one node and an identifier of a neighboring node of the one node corresponding to a variable of the function.

In an exemplary embodiment, the condition area may be an information area for representing an initial state and a limit state of the one node, the condition area may be separately expressed by a separator, and the condition area may be finished with an ending mark.

In an exemplary embodiment, the state updater may determine whether the updated state is against the condition of limitation, and may store an updated state of the system when the updated state is not against the condition of limitation.

In an exemplary embodiment, the device may further include a convergence analyzer which determines whether to finish an analysis on the interaction network based upon a state history of the system.

In an exemplary embodiment, the convergence analyzer may finish the analysis when the system continues staying in one state in the state history.

In an exemplary embodiment, the convergence analyzer may finish the analysis when a plurality of states is repeated with a constant period and a repetition order of the states is the same in the state history.

In an exemplary embodiment, the convergence analyzer may finish the analysis when the update is performed over a predetermined number of times and the system does not converge to at least one state.

In such embodiments, the interaction network may be efficiently analyzed by using data having a structure in which information on the entire factors influencing the state of the node included in the interaction network is arranged in series, and the user who studies the interaction network may easily redefine information on the data for describing the state of the node.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
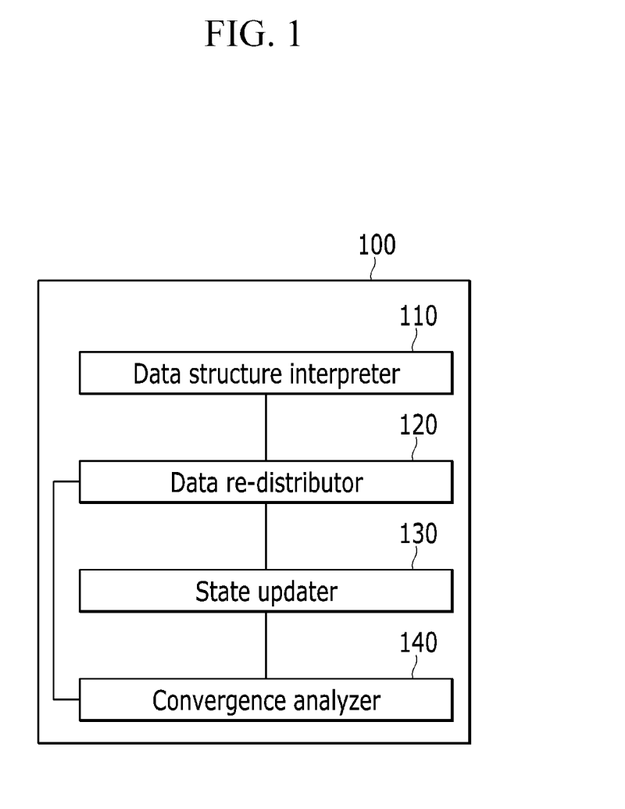
FIG. 1 shows a block diagram of a device for analyzing an interaction network according to an exemplary embodiment.

Hereinafter, exemplary embodiments of the invention will be described with reference to the accompanying drawings. FIG. 1 shows a block diagram of a device for analyzing an interaction network according to an exemplary embodiment, FIG. 2 shows a data structure of data that are input to a device for analyzing an interaction network according to an exemplary embodiment, and FIG. 3 shows part of an interaction network according to an exemplary embodiment.

Referring to FIG. 1, an exemplary embodiment of the device 100 for analyzing an interaction network includes a data structure interpreter 110, a data re-distributer 120, a state updater 130, and a convergence analyzer 140.

In an exemplary embodiment, the data structure interpreter 110 interprets data input by a user or input data, tags the interpreted data, and transmits the tagged data to the data re-distributer 120 together with information (e.g., information to describe the state of the node in the interaction network) acquired based upon a data interpretation. The data input by the user may be a script for expressing each node of the interaction network. To interpret the data, the data structure interpreter 110 may verify whether the structure of the data may be available for definition-based interpretation. The verification may be performed based upon state update rules and constraints on states for the data. When part of the input data is omitted but a default value may be used, the data structure interpreter 110 may determine the structure of the input data to be available for the definition-based interpretation.

Figure 2:
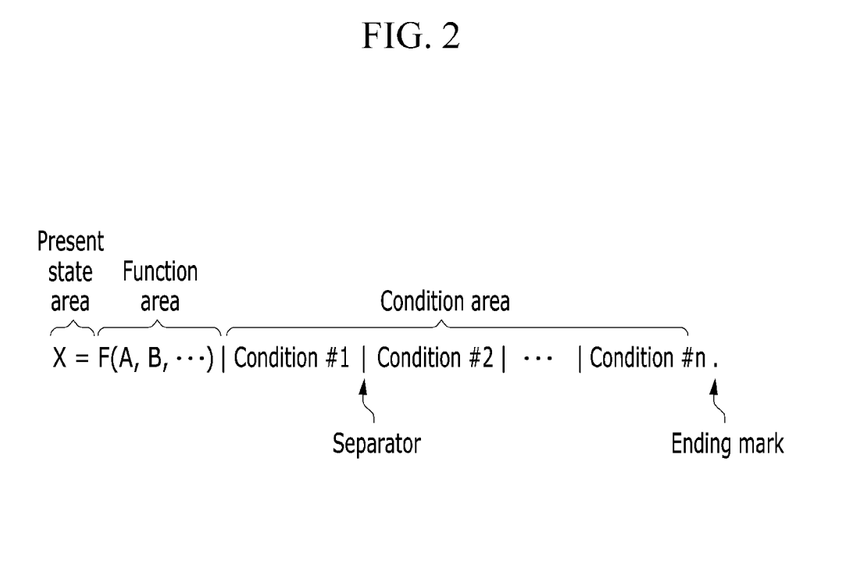
FIG. 2 shows a data structure of data that are input to a device for analyzing an interaction network according to an exemplary embodiment.
Figure 3:
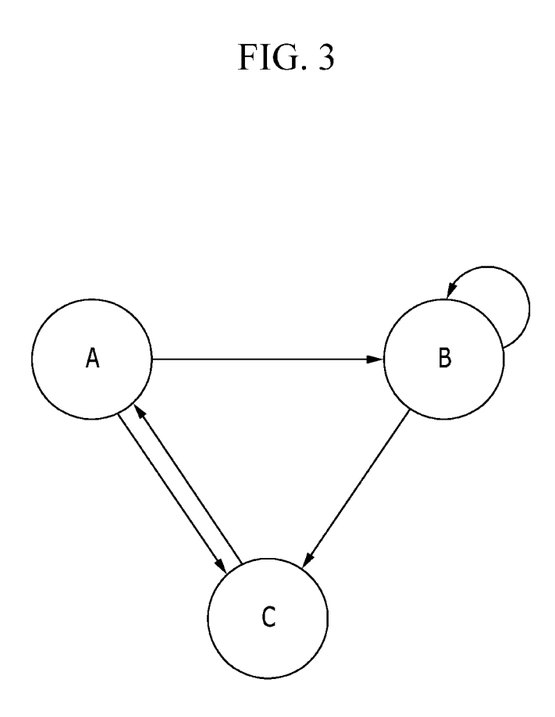
FIG. 3 shows a part of an interaction network according to an exemplary embodiment.

Referring to FIG. 2, the data for expressing a node X is structured to include a present state area a function area and a condition area. The present state area, the function area and the condition area included in the data may be arranged in series with a single node.

The state area of the data structure represents an information area for indicating a state of the node X.

The function area of the data structure represents an information area for indicating a factor for influencing the state of the node X, and includes a function that indicates a method that influences the state of the node X, and an identifier of a neighboring node of the node X that corresponds to a variable of the function. In such an embodiment, the node described as a variable of a function in the function area is a node that influences the state of the node X, and a function in the function area indicates how the neighboring node of the node X influences the states of the node X. In such an embodiment, the function may include anything that may be expressed in the function form such as a logical function, e.g., the Boolean logic, a truth table based corresponding function, or a differential equation.

The condition area of the data structure represents an information area for indicating an initial state and a limit state of the node. In the condition area, the initial state may be expressed to be zero (0) or 1, and a mark "-" of the limit state may signify "no limit."

In the condition area, the respective conditions may be individually expressed by using separators and may be finished with an ending mark for expressing an ending of declaration. Referring to FIG. 2, "|" is used for the separator, and "." is used for the ending mark.

Therefore, according to an exemplary embodiment, the states of the node included in the data, e.g., information acquired based upon data interpretation, may include a function described in the function area, a neighboring node corresponding to a variable of the function, and a condition described in the condition area.

Equation 1 expresses an exemplary embodiment of data that are input to computer simulate the interaction network of FIG. 3.

$$A = F_A(C)|1|1|-.$$

$$B = F_B(A,B)|0|-|-.$$

$$C = F_C(A,B)|0|-|\gg. \quad \text{(Equation 1)}$$

Referring to FIG. 3 and Equation 1, regarding the data for describing the nodes A, B and C, the condition area indicates an initial state, a limit state and a resultant output. A state of the node A is influenced by a function $F_A$ having the node C as a variable, the initial state of the node A is 1, the limit state is 1, and the resultant state of the node A is not output. A state of the node B is influenced by a function $F_B$ having the nodes A and B as variables, the initial state of the node B is 0, the limit state is "no limit," and the resultant state of the node B is not output. A state of the node C is influenced by a function $F_C$ having the nodes A and B as variables, the initial state of the node C is zero (0), the limit state is "no limit," and the result state of the node C may be output.

In an exemplary embodiment, the data re-distributer 120 transmits an operation rule on the tagged data to the state updater 130, and stores information acquired based on data interpretation in a state of the system database and a constraints database.

In an exemplary embodiment, the state updater 130 checks the present state of the system expressed as the interaction network and an applied state of the condition of limitation from the state of the system database and the constraints database, and updates the state of the system based on the operation rule. In such an embodiment, the state updater 130 may update the states of the respective nodes expressed in the input data according to a sync mode or an async mode. In one exemplary embodiment, for example, an order (e.g., the sync mode or the async mode) for updating the state by the state updater 130 may be determined by the user's setting, and in such an embodiment, information on the order for updating the state may not be included in the input data.

In such an embodiment, the state updater 130 may update the state of the entire system by determining the states of the entire nodes described or defined in the data. The state updater 130 determines (or confirms) if the updated state of the system is against the condition of limitation included in the data, and if not, the state updater 130 stores the updated state of the system in the state of the system database.

In an exemplary embodiment, the convergence analyzer 140 analyzes a state history of the system stored in the state of the system database and determines whether to finish an analysis on the interaction network. In such an embodiment, the convergence analyzer 140 determines whether the state of the system converges to at least one node and determines whether to finish the analysis on the interaction network based on a determination result.

An exemplary embodiment of a method for analyzing an interaction network will now be described with reference to a function of the convergence analyzer 140.

Figure 4:
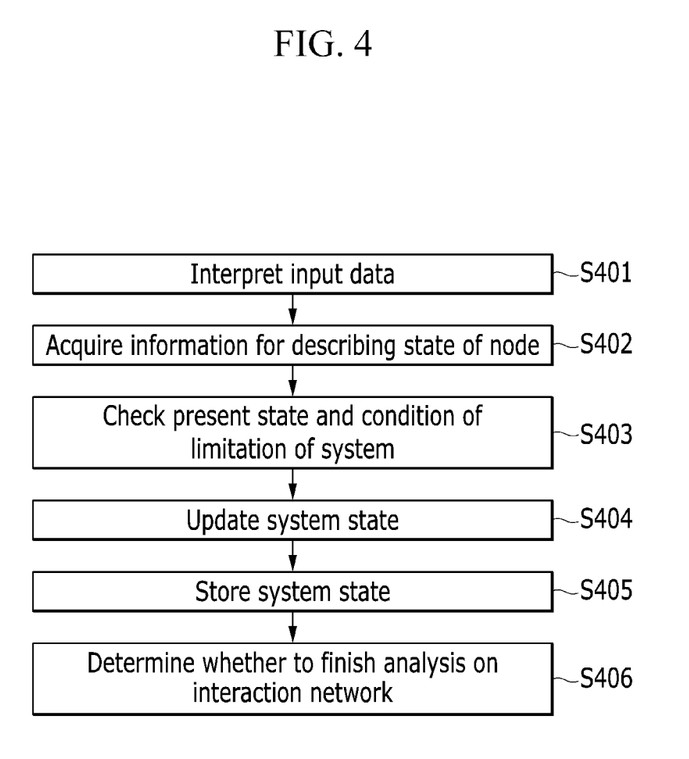
FIG. 4 shows a flowchart of a method for analyzing an interaction network according to an exemplary embodiment.

FIG. 4 shows a flowchart of a method for analyzing an interaction network according to an exemplary embodiment.

Referring to FIG. 4, an exemplary embodiment of a device for analyzing an interaction network interprets data input by a user or input data (S401) to acquire information for describing a state of a node from a data structure (S402). In such an embodiment, the data may be interpreted after the data structure of the input data is verified whether to be available for definition-based interpretation.

When the data interpretation is finished after verification, the device for analyzing an interaction network checks the present state of the system and determines whether to apply the condition of limitation from the state of the system database and the constraints database (S403). The device for analyzing an interaction network applies an operation rule to the tagged data after data interpretation to determine the state of the node described in the data, thereby updating the state of the system configured with a plurality of nodes (S404).

When the state of the system is updated, it is checked whether the updated state of the system is against the condition of limitation described in the data, and the updated state of the system is stored (S405).

The device for analyzing an interaction network determines whether to finish the analysis on the interaction network based on the stored state history of the system (S406). The device for analyzing an interaction network may finish the analysis on the interaction network based on the following four cases.

First, in the state history, when the system continues staying in one state or a same state before and after it is updated, the analysis on the interaction network may be finished.

Second, in the state history, when a plurality of states is repeated with a constant period, a repetition order of a plurality of states is the same, and the state of the system is circulated in a plurality of states, the analysis on the interaction network may be finished.

Third, in the state history, when the state of the system is not circulated in a plurality of states but several states that often appear are repeated with a constant period and the repetition order is the same, the analysis on the interaction network may be finished.

Finally, when the update is performed over a predetermined number of times (e.g., 1,000 times) and the system fails to converge into at least one state, the analysis on the interaction network may be finished.

In an exemplary embodiment, as described above, the device for analyzing an interaction network may efficiently analyze the interaction network by using the data with the structure in which information on the entire factors for influencing the state of the node included in the interaction network is arranged in series, and the user studying the interaction network may easily redefine information of data for describing the state of the node.

Figure 5:
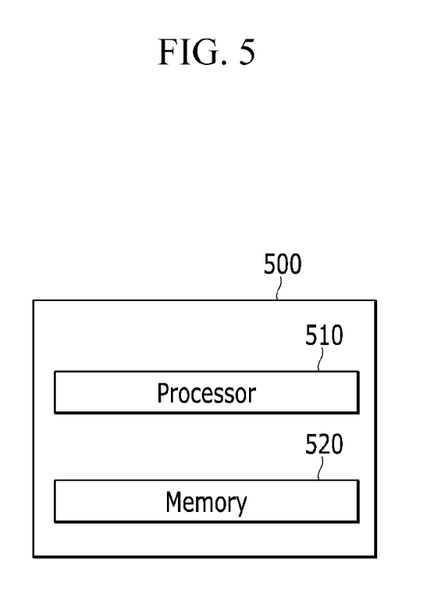
FIG. 5 shows a block diagram of a device for analyzing an interaction network according to an exemplary embodiment.

FIG. 5 shows a block diagram of a device for analyzing an interaction network according to an exemplary embodiment.

Referring to FIG. 5, an exemplary embodiment of the device 500 for analyzing an interaction network includes a processor 510 and a memory 520. The processor 511 may realize the function, process or method described above. The memory 520 may be connected to the processor 510 and may store various kinds of information for driving the processor 510 or at least one program executed by the processor 511. In such an embodiment, an operation of the device 500 for analyzing an interaction network may be realized by the processor 510.

In such an embodiment, the memory 520 may be disposed inside or outside the processor 510, and may be connected to the processor 510 through at least one of various kinds of means know in the art. The memory 520 may be a volatile or non-volatile storage medium in various forms. In one exemplary embodiment, for example, the memory 520 may include a read-only memory ("ROM") or a random access memory ("RAM").

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for analyzing an interaction network using input data in which information for describing a plurality of nodes are arranged in series, the method comprising:
   interpreting input data; and
   determining states of the nodes described to the input data based on information acquired by the interpretation of the input data, and updating a state of a system expressed as the interaction network based on the states of the nodes,
   wherein the information for describing the states of the nodes includes a state area, a function area and a condition area, and the input data has a structure in which the state area, the function area and the condition area are arranged in series for one node of the nodes.

2. The method of claim 1, wherein
the state area is an information area for describing a state of the one node.

3. The method of claim 1, wherein
the function area is an information area for indicating a factor influencing a state of the one node, and
the function area includes a function for showing a method influencing the state of the one node and an identifier of a neighboring node of the one node corresponding to a variable of the function.

4. The method of claim 1, wherein
the condition area is an information area for representing an initial state and a limit state of the one node,
the condition area is separately expressed by a separator, and
the condition area is finished with an ending mark.

5. The method of claim 1, further comprising:
determining whether the updated state is against a condition of limitation; and
when the updated state is not against the condition of limitation, storing an updated state of the system.

6. The method of claim 5, further comprising:
determining whether to finish an analysis on the interaction network based on a state history of the system.

7. The method of claim 6, wherein the determining whether to finish the analysis on the interaction network comprises:
finishing the analysis when the system continues staying in one state in the state history.

8. The method of claim 6, wherein the determining whether to finish the analysis on the interaction network comprises:
finishing the analysis when a plurality of states is repeated with a constant period and a repetition order of the states is the same in the state history.

9. The method of claim 6, wherein the determining whether to finish the analysis on the interaction network comprises:
finishing the analysis when the update is performed over a predetermined number of times and the system does not converge to at least one state.

10. A device for analyzing an interaction network using input data in which information for describing a plurality of nodes are arranged in series, the device comprising:
    a data structure interpreter which interprets input data; and
    a state updater which determines states of the nodes described to the input data based upon information acquired by the interpretation of the input data, and updates a state of a system expressed as the interaction network based on the states of the nodes,
    wherein the information for describing the states of the nodes includes a state area, a function area and a condition area, and the input data has a structure in which the state area, the function area and the condition area are arranged in series for one node of the nodes.

11. The device of claim 10, wherein
the state area is an information area for describing a state of the one node.

12. The device of claim 10, wherein
the function area is an information area for indicating a factor influencing a state of the one node, and
the function area includes a function for showing a method influencing the state of the one node and an identifier of a neighboring node of the one node corresponding to a variable of the function.

13. The device of claim 10, wherein
the condition area is an information area for representing an initial state and a limit state of the one node,
the condition area is separately expressed by a separator, and
the condition area is finished with an ending mark.

14. The device of claim 10, wherein
the state updater determines whether the updated state is against the condition of limitation, and stores an updated state of the system when the updated state is not against the condition of limitation.

15. The device of claim 14, further comprising:
a convergence analyzer which determines whether to finish an analysis on the interaction network based on a state history of the system.

16. The device of claim 15, wherein
the convergence analyzer finishes the analysis when the system continues staying in one state in the state history.

17. The device of claim 15, wherein
the convergence analyzer finishes the analysis when a plurality of states is repeated with a constant period and a repetition order of the states is the same in the state history.

18. The device of claim 15, wherein
the convergence analyzer finishes the analysis when the update is performed over a predetermined number of times and the system does not converge to at least one state.

* * * * *